United States Patent
DiFoggio (10) Patent No.: US 9,995,088 B2
(45) Date of Patent: Jun. 12, 2018

(54) CUTTING ELEMENTS COMPRISING SENSORS, EARTH-BORING TOOLS COMPRISING SUCH CUTTING ELEMENTS, AND METHODS OF FORMING WELLBORES WITH SUCH TOOLS

(71) Applicant: Baker Hughes, a GE company, LLC, Houston, TX (US)

(72) Inventor: Rocco DiFoggio, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 445 days.

(21) Appl. No.: 14/219,886

(22) Filed: Mar. 19, 2014

(65) Prior Publication Data

US 2014/0326506 A1 Nov. 6, 2014

Related U.S. Application Data (60) Provisional application No. 61/819,720, filed on May 6, 2013.

(51) Int. Cl.
*E21B 10/567* (2006.01)
*G01H 15/00* (2006.01)
*G01V 1/00* (2006.01)

(52) U.S. Cl.
CPC .......... *E21B 10/567* (2013.01); *G01H 15/00* (2013.01); *G01V 1/001* (2013.01)

(58) Field of Classification Search
CPC ....... E21B 10/567; E21B 12/02; G01H 15/00; G01V 1/001
See application file for complete search history.

(56) References Cited

U.S. PATENT DOCUMENTS

| | | | |
|---|---|---|---|
| 4,034,066 A | * | 7/1977 | Strong ..................... B01J 3/062 117/224 |
| 7,423,258 B2 | | 9/2008 | DiFoggio et al. |

(Continued)

FOREIGN PATENT DOCUMENTS

WO 2013026718 A2 2/2013

OTHER PUBLICATIONS

Avseth et al., Quantitative Seismic Interpretation: Applying Rock Physics Tools to Reduce Interpretation Risk, (2005), pp. 168-211.

(Continued)

*Primary Examiner* — Robert E Fuller
(74) *Attorney, Agent, or Firm* — TraskBritt (57) ABSTRACT

An earth-boring tool includes a cutting element comprising a hard material and at least one of a signal generator configured to provide an electromagnetic or acoustic signal to an interface between a surface of the hard material and a surface of a subterranean formation, and a sensor configured to receive an electromagnetic or acoustic signal from the interface. A method of forming a wellbore includes rotating the earth-boring tool within a wellbore and cutting formation material with a cutting element, transmitting a signal through the cutting element to an interface between the cutting element and the formation material, and measuring a response received at a sensor. A cutting element includes a transmitter oriented and configured to dispense a signal to an interface between the cutting surface and a surface of a formation and a sensor oriented and configured to measure a signal from the interface.

18 Claims, 4 Drawing Sheets

(56) References Cited

U.S. PATENT DOCUMENTS

| | | | |
|---|---|---|---|
| 8,023,690 | B2 | 9/2011 | DiFoggio et al. |
| 2012/0325564 | A1* | 12/2012 | Vaughn .................. E21B 10/36 175/428 |
| 2013/0068540 | A1 | 3/2013 | DiGiovanni |
| 2013/0068541 | A1 | 3/2013 | DiGiovanni et al. |
| 2015/0322720 | A1* | 11/2015 | Pelletier ................. E21B 47/01 175/41 |

OTHER PUBLICATIONS

Clark, "Spectroscopy of Rocks and Minerals, and Principles of Spectroscopy," in Manual of Remote Sensing, vol. 3, Remote Sensing for the Earth Sciences, (A.N. Rencz, ed., 1999), pp. 3-58.

DiGiovanni et al., U.S. Appl. No. 13/839,589 entitled Polycrystalline Compacts Including Diamond Nanoparticles, Cutting Elements and Earth Boring Tools Including Such Compacts, and Methods of Forming Same, filed Sep. 10, 2013.

Hunt et al., "Visible and Near-Infrared Spectra of Minerals and Rocks: I Silicate Minerals," 1 Modern Geology, (1970), pp. 283-300.

Khabashesku et al., U.S. Appl. No. 13/782,341 entitled, Methods of Fabricating Polycrystalline Diamond by Functionalizing Diamond Nanoparticles, Green Bodies Including Functionalized Diamond Nanoparticles, and Methods of Forming Polycrystalline Diamond Cutting Elements, filed Mar. 1, 2013.

May et al., "Preparation of CVD Diamond Wires, Fibres, and Tubes," Proc. 3rd Int. Symp. Diamond Maters., Honolulu, (May 1993), pp. 1036-1041.

May et al., Preparation of Solid and Hollow Diamond Fibres and the Potential for Diamond Fibre Metal Matrix Composites, 13 J. Materials Science Letters, (1994), pp. 247-249.

Nietzche, Friedrich, Common Techniques for Quantitative Seismic Interpretation, Cambridge University Press, (2005), pp. 168-211.

Pironon et al, "Water in Petroleum Inclusions: Evidence from Raman and FT-IR Measurements, PVT Consequences," 69-70 Journal of Geochemical Exploration, (Jun. 2000), pp. 663-668.

Povarennykh, A.S., "The Use of Infrared Spectra for the Determination of Minerals," 63 American Mineralogist, (1978), pp. 956-959.

Salisbury et al., "Application of Seismic Methods to Mineral Exploration," in W.D. Goodfellow, ed., Mineral Deposits of Canada: A Synthesis of Major Deposit-Types, District Metallogeny, the Evolution of Geological Provinces, and Exploration Methods, (Geological Assoc. of Canada, 2007), pp. 971-982.

Stopar et al., "Raman Efficiencies of Natural Rocks and Minerals: Performance of a Remote Raman System for Planetary Exploration at a Distance of 10 Meters," 61 Spectrochimica Acta A: Molecular and Biomolecular Spectroscopy (2005), pp. 2315-2323.

Wang et al., "Raman Spectroscopy as a Method for Mineral Identification on Lunar Robotic Exploration Missions," 100 J. Geophysical Research, (1995), pp. 21189-21199.

* cited by examiner

CUTTING ELEMENTS COMPRISING SENSORS, EARTH-BORING TOOLS COMPRISING SUCH CUTTING ELEMENTS, AND METHODS OF FORMING WELLBORES WITH SUCH TOOLS

CROSS-REFERENCE TO RELATED APPLICATION

This application claims the benefit of the filing date of the U.S. Provisional Patent Application No. 61/819,720, filed May 6, 2013, the disclosure of which is hereby incorporated herein it its entirety by this reference.

FIELD

Embodiments of the present disclosure generally relate to drill bits and cutting elements that include a signal generator and/or a sensor, and to methods of forming and using such drill bits and cutting elements.

BACKGROUND

Earth-boring tools are commonly used for forming (e.g., drilling and reaming) bore holes or wells (hereinafter "wellbores") in earth formations. Earth-boring tools include, for example, rotary drill bits, core bits, eccentric bits, bi-center bits, reamers, underreamers, and mills.

Different types of earth-boring rotary drill bits are known in the art including, for example, fixed-cutter bits (which are often referred to in the art as "drag" bits), roller cone bits (which are often referred to in the art as "rock" bits), diamond-impregnated bits, and hybrid bits (which may include, for example, both fixed cutters and roller cones). The drill bit is rotated and advanced into the subterranean formation. As the drill bit rotates, the cutters or abrasive structures thereof cut, crush, shear, and/or abrade away the formation material to form the wellbore.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

The cutting elements used in earth-boring tools often include polycrystalline diamond cutters (often referred to as "PDCs"), which are cutting elements that include a polycrystalline diamond (PCD) material. Such polycrystalline diamond-cutting elements may be formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as high temperature/high pressure (or "HTHP") processes. The cutting element substrate may include a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HTHP process.

The oil and gas industry expends sizable sums to design cutting tools, such as downhole drill bits including roller cone rock bits and fixed-cutter bits. Such drill bits may have relatively long service lives with relatively infrequent failure. In particular, considerable sums are expended to design and manufacture roller cone rock bits and fixed-cutter bits in a manner that minimizes the probability of catastrophic drill bit failure during drilling operations. The loss of a roller cone or a polycrystalline diamond compact from a bit during drilling operations can impede the drilling operations and, at worst, necessitate rather expensive fishing operations.

Diagnostic information related to a drill bit and certain components of the drill bit may be linked to the durability, performance, and the potential failure of the drill bit. In addition, characteristic information regarding the rock formation may be used to estimate performance and other features related to drilling operations. Logging while drilling (LWD), measuring while drilling (MWD), and front-end measurement device (FEMD) measurements are conventionally obtained from measurements behind the drill head, such as at several feet away from the cutting interface.

BRIEF SUMMARY

In some embodiments, an earth-boring tool includes at least one cutting element comprising a hard material and at least one of a signal generator configured to provide an electromagnetic or acoustic signal to an interface between a surface of the hard material and a subterranean formation in contact with at least a portion of the surface, and a sensor configured to receive a return electromagnetic or acoustic signal from the interface.

A method of forming a wellbore includes rotating an earth-boring tool within a wellbore and cutting formation material with at least one cutting element mounted thereto, transmitting a signal through at least one cutting element to an interface between a surface of the at least one cutting element and the formation material, and measuring a response received at a sensor from the interface as the at least one cutting element is used to cut formation material. The at least one cutting element comprises a generally planar volume of hard material. The earth-boring tool further comprises a transmitter coupled to the at least one cutting element, the transmitter comprising at least one of an electromagnetic and an acoustic transmitter, and a sensor coupled to the at least one cutting element. The sensor is at least one of a spectrometer and an acoustic receiver, the signal is at least one of an electromagnetic signal and an acoustic signal, and the response is at least one of an electromagnetic and an acoustic response.

In some embodiments, a cutting element for an earth-boring drilling tool includes a cutting element body having a cutting surface thereon, at least one transmitter oriented and configured to dispense an electromagnetic or acoustic signal to an interface between the cutting surface and a surface of a subterranean formation engaged by at least a portion of the cutting surface, and at least one sensor oriented and configured to measure a signal returned from the interface between the cutting surface and the surface of the subterranean formation engaged by the at least a portion of the cutting surface.

BRIEF DESCRIPTION OF THE DRAWINGS

While the specification concludes with claims particularly pointing out and distinctly claiming embodiments of the present invention, advantages of embodiments of the disclosure may be more readily ascertained from the description of certain example embodiments set forth below, when read in conjunction with the accompanying drawings, in which:

DETAILED DESCRIPTION

The illustrations presented herein are not meant to be actual views of any particular cutting element, earth-boring tool, or portion of such a cutting element or tool, but are merely idealized representations that are employed to describe embodiments of the present disclosure. Additionally, elements common between figures may retain the same numerical designation.

In this description, specific implementations are shown and described only as examples and should not be construed as the only way to implement the present invention unless specified otherwise herein. It will be readily apparent to one of ordinary skill in the art that the various embodiments of the present disclosure may be practiced in other arrangements or combinations.

Referring in general to the following description and accompanying drawings, various embodiments of the present disclosure are illustrated. Common elements of the illustrated embodiments may be designated with similar reference numerals. It should be understood that the figures presented are not meant to be illustrative of actual views of any particular portion of the actual structure or method, but are merely idealized representations employed to more clearly and fully depict the present invention defined by the claims below. The illustrated figures may not be drawn to scale.

As used herein, the term "earth-boring tool" means and includes any type of bit or tool used for drilling during the formation or enlargement of a wellbore in subterranean formations and includes, for example, fixed-cutter bits, rotary drill bits, percussion bits, core bits, eccentric bits, bi-center bits, reamers, mills, drag bits, roller cone bits, hybrid bits and other drilling bits and tools known in the art.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "hard material" means and includes any material having a Knoop hardness value of about 3,000 $Kg_f/mm^2$ (29,420 MPa) or more. Hard materials include, for example, diamond and cubic boron nitride.

Figure 1:
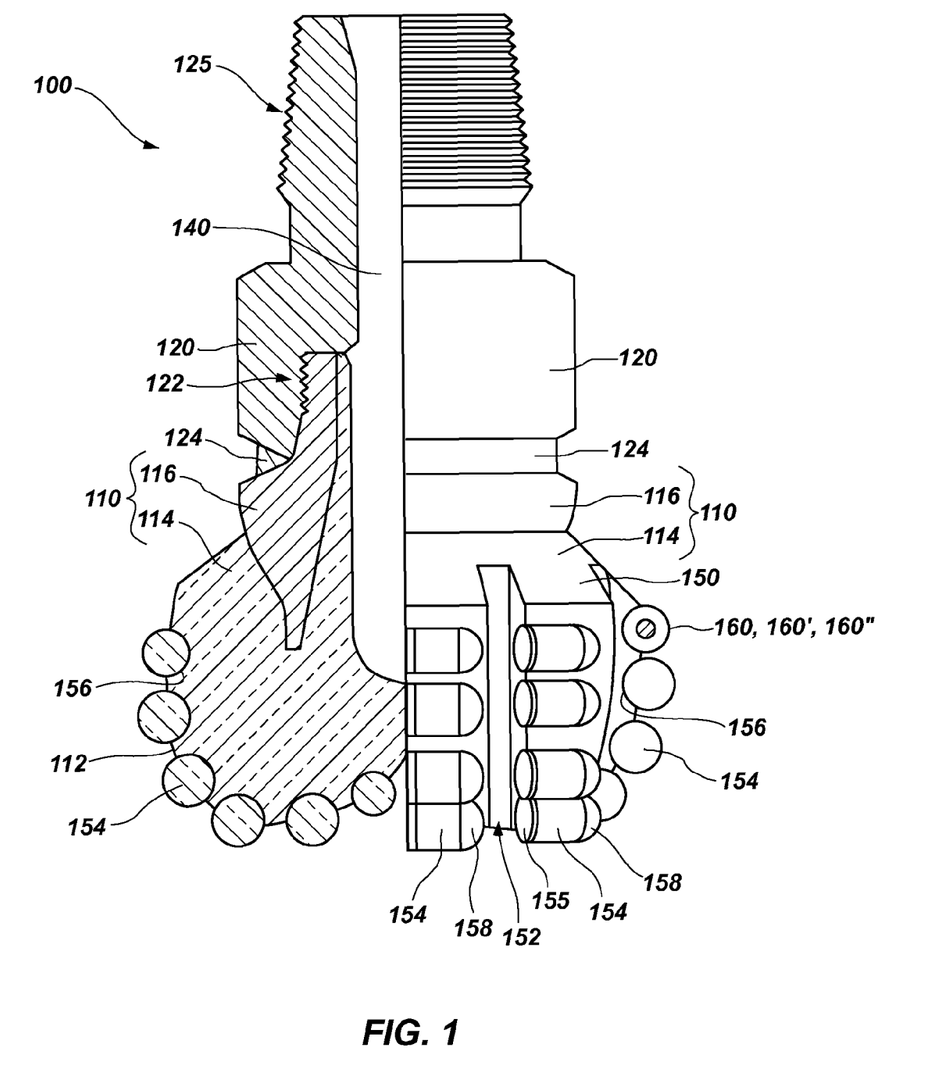
FIG. 1 is a partial cross-sectional view of an embodiment of an earth-boring drill bit.

FIG. 1 is a partial cross-sectional view of an earth-boring drill bit 100, which may be employed in embodiments of the present disclosure. The earth-boring drill bit 100 includes a bit body 110, which may be formed from steel. In some embodiments, the bit body 110 may be formed from a particle-matrix composite material. For example, the bit body 110 may further include a crown 114 and a steel blank 116. The steel blank 116 is partially embedded in the crown 114. The crown 114 may include a particle-matrix composite material, such as particles of tungsten carbide embedded in a copper alloy matrix material. The bit body 110 may be secured to a shank 120 by way of a threaded connection 122 and a weld 124 extending around the earth-boring drill bit 100 on an exterior surface thereof, along an interface between the bit body 110 and the shank 120. Other methods may be used to secure the bit body 110 to the shank 120.

Figure 2:
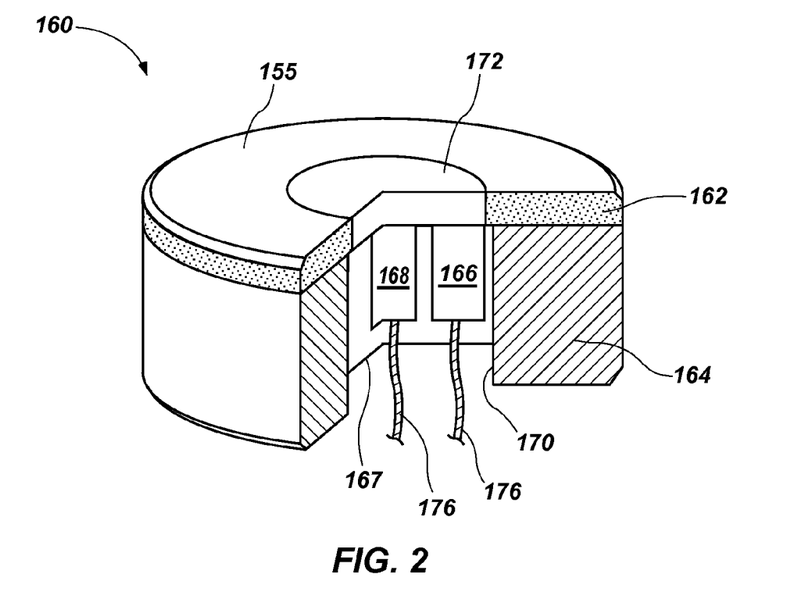
FIGS. 2 through 4 are partial cross-sectional views of cutting elements having sensors.
Figure 3:
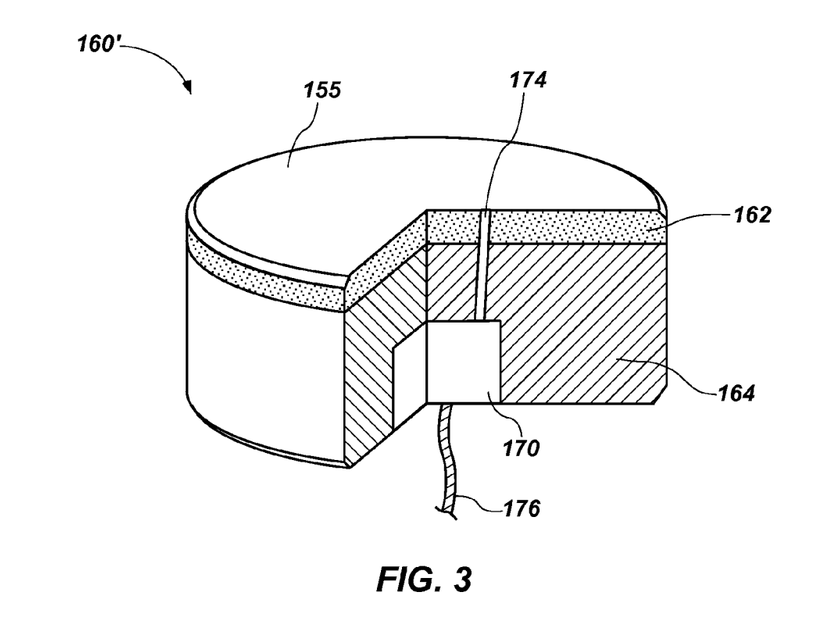
Figure 4:
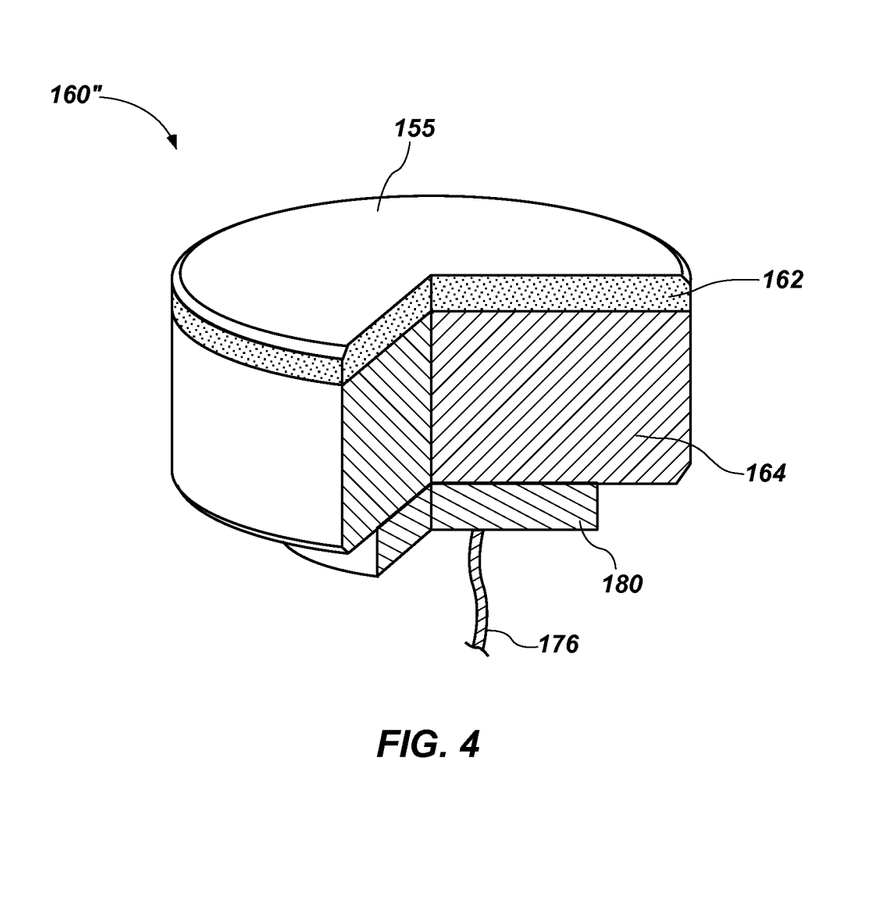

The earth-boring drill bit 100 may include a plurality of cutting elements 154 attached to a face 112 of the bit body 110. Generally, the cutting elements 154 of a fixed-cutter type drill bit have either a disk shape or a substantially cylindrical shape. A cutting element 154 includes a cutting surface 155 located on a substantially circular end surface of the cutting element 154. The cutting surface 155 may be formed by disposing a hard, superabrasive material, such as mutually bound particles of polycrystalline diamond formed into a "diamond table" under high pressure, high temperature (HPHT) conditions, on a supporting substrate. The diamond table may be formed onto the substrate during the HPHT process, or may be bonded to the substrate thereafter. Such cutting elements 154 are often referred to as a polycrystalline compact or a polycrystalline diamond compact (PDC) cutting element 154. The cutting elements 154 may be provided along blades 150, and within pockets 156 formed in the face 112 of the bit body 110, and may be supported from behind by buttresses 158, which may be integrally formed with the crown 114 of the bit body 110. Cutting elements 154 may be fabricated separately from the bit body 110 and secured within the pockets 156 formed in the outer surface of the bit body 110. If the cutting elements 154 are formed separately from the bit body 110, a bonding material (e.g., adhesive, braze alloy, etc.) may be used to secure the cutting elements 154 to the bit body 110. The earth-boring drill bit 100 may also include one or more cutting elements 160, 160', 160" instrumented with a sensor, as shown in FIGS. 2 through 4 and described in more detail below.

The bit body 110 may further include junk slots 152 separating the blades 150. Internal fluid passageways (not shown) extend between the face 112 of the bit body 110 and a longitudinal bore 140, which extends through the shank 120 and partially through the bit body 110. Nozzle inserts (not shown) also may be provided at the face 112 of the bit body 110 in fluid communication with the internal fluid passageways.

The earth-boring drill bit 100 may be secured to the end of a drill string, which may include tubular pipe and equipment segments (e.g., drill collars, a motor, a steering tool, stabilizers, etc.) coupled end-to-end between the earth-boring drill bit 100 and other drilling equipment at the surface of the formation to be drilled. As one example, the earth-boring drill bit 100 may be secured to the drill string with the bit body 110 being secured to the shank 120 having a threaded connection 125 and engaging with a threaded connection of the drill string. An example of such a threaded connection portion is an American Petroleum Institute (API) threaded connection.

During drilling operations, the earth-boring drill bit 100 is positioned at the bottom of a borehole such that the cutting elements 154 are adjacent the subterranean formation to be drilled. Equipment such as a rotary table or a top drive may be used for rotating the drill string and the drill bit 100 within the borehole. Alternatively, the shank 120 of the earth-boring drill bit 100 may be coupled directly to the drive shaft of a down-hole motor, which may be used to rotate the earth-boring drill bit 100. As the earth-boring drill bit 100 is rotated, drilling fluid is pumped to the face 112 of the bit body 110 through the longitudinal bore 140 and the internal fluid passageways. Rotation of the earth-boring drill bit 100 causes the cutting elements 154 to scrape across and shear away the surface of the subterranean formation. The formation cuttings mix with, and are suspended within, the drilling fluid and pass through the junk slots 152 and the annular space between the well bore hole and the drill string to the surface of the earth formation.

FIG. 2 is a partial cross-sectional view of a cutting element 160 instrumented with a sensor. The cutting element 160 includes a diamond table 162 over a substrate 164, and includes a cutting surface 155 on the diamond table 162. The cutting element 160 includes a signal generator 166 and a sensor 168, which may be disposed within a void 170 within or defined by the substrate 164. Although the void 170 is shown near the center of the cutting element 160 for clarity of the illustration, the void 170 may be located anywhere in the cutting element 160. For example, the void 170 may be located adjacent a radially outward surface of the cutting element 160 or near a surface of the cutting element 160 in contact with the formation during drilling. The signal generator 166 is configured to provide a signal to an interface between the diamond table 162 and a subterranean formation when the cutting element 160 is in use. The sensor 168 is configured to receive a signal from the interface between the diamond table 162 and the subterranean formation when the cutting element 160 is in use. In some embodiments, the signal generator 166 and the sensor 168 may together be a single transceiver 167. In other embodiments, the signal generator 166 and the sensor 168 may be distinct devices, and may be disposed on or within the same cutting element 160 or on different cutting elements 160. After a first well is drilled in a field (which may be referred to in the art as a "wildcat well"), information about the layers of geologic formations of the earth (which may have different mineralogies) of the first well may be used to estimate an expected depth of those layers for subsequently drilled wells (which may be referred to in the art as "development wells"). Determining mineralogy at the bit in real-time may allow an operator to correlate the current bit location in terms of the geologic formations that had been drilled previously in nearby (or "offset") wells. Real-time mineralogy at the bit can also aid in geosteering and in knowing when a well is entering a formation known to be geopressured, based on experience with earlier offset wells.

In some embodiments, the transceiver 167 may be a spectrometer. For example, the transceiver 167 may be an infrared spectrometer, such as a mid-infrared spectrometer. The transceiver 167 may be configured to provide and detect electromagnetic radiation having wavelengths from about 2.5 μm to about 25.0 μm, such as from about 2.5 μm to about 12.0 μm. The transceiver 167 may be used to study fundamental vibrations and associated rotational-vibrational structures of the subterranean formation. The electromagnetic radiation provided by the signal generator 166 may penetrate a relatively short distance into the subterranean formation, such as from about 5.0 μm to about 75.0 μm from the surface (e.g., from about 2 to about 3 wavelengths of the radiation). Thus, the electromagnetic radiation may be used to measure properties of solid material at or near the surface of the material being cut, and may provide information about the composition of the material in real-time or near real-time. Infrared spectrometers may include pyroelectric infrared detectors (e.g., a single pyroelectric detector or an array of pyroelectric detectors). For example, pyroelectric infrared spectral detectors are available from InfraTec GmbH, of Dresden, Germany, from Pyreos Ltd. of Edinburgh, Scotland, UK, and from IR Microsystems, of Lausanne, Switzerland. Such spectral detectors may fit within the space occupied by conventional cutting elements, and may be coupled with an infrared source.

In some embodiments, the infrared source may include a hot filament (e.g., a filament maintained at about 950° C.); a steady-state infrared emitter (e.g., as available from Helioworks, Inc., of Santa Rosa, Calif.) in combination with a mechanical or other beam chopper; a micro-machined, electrically-modulated, thermal infrared emitter (e.g., as available from Leister Process Technologies LLC, of Itasca, Ill. under the trade name AXETRIS®), an infrared light-emitting diode (e.g., as available from LED Microsensor NT, LLC, of Saint Petersburg, Russia), a superluminescent light-emitting diode (e.g., as available from DenseLight Semiconductor, of Singapore), a laser diode (e.g., as available from nanoplus GmbH, of Gerbrunn, Germany), or a supercontinuum fiber laser (e.g., as available from Omni Sciences, Inc., of Dexter, Mich.).

The infrared source may be, for example, a modulated or pulsed source. The small size of spectral detectors means that their components have small mass (m) so, under high accelerations (a) associated with the shock and vibration of a drill bit, they experience correspondingly small forces (F) because The transceiver 167 may include a microprocessor configured to calculate one or more properties of the subterranean formation. For example, the transceiver 167 may include a source, detector, and/or microprocessor as described in U.S. Pat. No. 7,423,258, issued Sep. 9, 2008, and titled "Method and Apparatus for Analyzing a Downhole Fluid Using a Thermal Detector," the disclosure of which is incorporated herein in its entirety by this reference.

In some embodiments, the transceiver 167 may be a Raman spectrometer. The transceiver 167 may be configured to emit and detect electromagnetic radiation having wavelengths from about 200 nm to about 1500 nm, such as from about 250 nm to about 100 nm. The transceiver 167 may be used to study vibrational, rotational, and other low-frequency modes of the material of the subterranean formation. The electromagnetic radiation may irradiate the material of the subterranean formation, and the sensor 168 may be configured to detect photons of energy shifted from the wavelength provided by the signal generator 166. Thus, the electromagnetic radiation may be used to measure properties of solid material at or near the surface of the material being cut, and may gather information about the composition of the material in real-time or near real-time. Such information also may be transmitted to the surface of the formation for analysis in real-time or near real-time. In addition or as an alternative, the information acquired may be stored in memory within the cutting element, the drill bit, or the bottom-hole assembly for analysis subsequent to the drilling operation after removing the bottom-hole assembly from the wellbore.

Electromagnetic radiation transmitted from the signal generator 166 and received by the sensor 168 may pass through the diamond table 162. In some embodiments, the cutting element 160 may include a window 172 through which the radiation may be transmitted and received. The window 172 may be any material transparent to a wavelength of radiation transmitted from the signal generator 166 and received by the sensor 168. Some materials transparent to various wavelengths of radiation that may be used as windows 172 include AgBr, AgCl, $Al_2O_3$ (sapphire), GeAsSe glass, $BaF_2$, $CaF_2$, CdTe, AsSeTe chalcogenide glass, CsI, diamond, GaAs, Ge, KBr, TlBrI, LiF, $MgF_2$, NaCl, high-density polyethylene, borosilicate glass, Si, $SiO_2$ (quartz), ZnS, or ZnSe. Because the cutting element 160 may be subjected to harsh downhole conditions of high pressure, high temperature, and immersion in hot, aqueous or corrosive fluids, some of these materials may not have suitable chemical resistance or mechanical strength for use in cutting elements 160. The material of the window 172 may be selected for its ability to withstand drilling conditions. For example, the window 172 may be a single-crystal diamond. Diamond transmits electromagnetic radiation well in the range from about 0.25 μm to about 50.0 μm, so it may be particularly suited for transmission of mid-infrared radiation. Furthermore, diamond has properties that make it amenable for use in drilling environments (e.g., chemical inertness, strength, etc.). The window 172 may be selected to have dimensions to accommodate the signal generator 166 and the sensor 168. For example the window 172 may be disc-shaped with a diameter of about 0.25 inch (about 6 mm) or less, about 0.125 inch (about 3 mm) or less, or even about 0.04 inch (about 1 mm) or less. The window 172 may have a thickness approximately the same as a thickness of the diamond table 162. In other embodiments, the window 172 may have a thickness greater than or less than the thickness of the diamond table 162. The window 172 may be secured within the diamond table 162 and/or the substrate 164 by, for example, interbonding during an HPHT process, bonding with an adhesive, etc. In some embodiments, the window 172 may be or include another material transparent to a wavelength provided by the signal generator 166. For example, the window 172 may include silicon carbide or metallic silicon.

In certain embodiments, the radiation may be transmitted through the diamond table 162 itself, such as from one diamond particle to another between diamond-to-diamond contacts. In such embodiments, the diamond table 162 may be formed in such a manner as to increase the number or size of diamond-to-diamond contacts. For example the diamond table 162 may be formed as described in U.S. patent application Ser. No. 13/839,589, filed Mar. 15, 2013, and titled "Polycrystalline Diamond Compacts Including Diamond Nanoparticles, Cutting Elements and Earth-Boring Tools Including Such Compacts, and Methods of Forming Same;" U.S. patent application Ser. No. 13/782,341, filed Mar. 1, 2013, and titled "Methods of Fabricating Polycrystalline Diamond by Functionalizing Diamond Nanoparticles, Green Bodies Including Functionalized Diamond Nanoparticles, and Methods of Forming Polycrystalline Diamond Cutting Elements;" U.S. Patent Application Publication No. 2013/0068540, published Mar. 21, 2013, titled "Methods of Fabricating Polycrystalline Diamond, and Cutting Elements and Earth-Boring Tools Comprising Polycrystalline Diamond;" or U.S. Patent Application Publication No. 2013/0068541, published Mar. 21, 2013, titled "Methods of Fabricating Polycrystalline Diamond, and Cutting Elements and Earth-Boring Tools Comprising Polycrystalline Diamond." The entire disclosures of each of these applications and publications are incorporated herein by this reference.

In some embodiments, and as shown in FIG. 3, the radiation may be transmitted through one or more diamond fibers 174 that terminate at the edge of a cutting element 160'. In some embodiments, such fibers 174 may be or comprise optical fibers configured to convey electromagnetic radiation therethrough along the length of the fibers 174. The diamond fibers 174 may be formed as described in P. W. May et al., "Preparation of Solid and Hollow Diamond Fibres and the Potential for Diamond Fibre Metal Matrix Composites, 13 J. MATERIALS SCIENCE LETTERS 247-249 (1994); and P. W. May et al., "Preparation of CVD Diamond Wires, Fibres, and Tubes," PROC. 3RD INT. SYMP. DIAMOND MATERS., HONOLULU, May 1993, pp. 1036-1041. The entire disclosures of each of these publications are incorporated herein by this reference. The diamond fibers 174 may be secured within the diamond table 162 and/or the substrate 164 by, for example, interbonding during an HPHT process, bonding with an adhesive, etc.

The transceiver 167 (or the signal generator 166 and the sensor 168) may be connected to one or more electrical contacts 176. The electrical contacts 176 are depicted in FIGS. 2 and 3 as wires, but may also include pins, posts, terminals, blades, etc. The electrical contacts 176 may be connected to a data collection system and/or a controller. For example, a computer may serve as both a data collection system and a controller. The electrical contacts 176 may be configured to transfer electrical power and/or data. The electrical contacts 176 may be disposed within the bit body 110 (FIG. 1) and may transfer power and/or data along the drill string.

In some embodiments, the transceiver 167 may be an acoustic transceiver 180, as shown in the cutting element 160" of FIG. 4. The acoustic transceiver 180 may be configured to vibrate the cutting element 160" to generate acoustic waves that travel through the diamond table 162 and/or the substrate 164 to the subterranean formation. A portion of the acoustic waves may be reflected back to the acoustic transceiver 180, and some properties of the formation may be determined by comparing the reflected signal with the transmitted signal, as described in more detail below. The acoustic transceiver 180 may provide and detect vibrations having frequencies from the low audible (15 Hz) to the high ultrasonic (1 GHz), such as in the ultrasonic range of about 50 KHz to about 100 MHz. Acoustic waves transmitted from the acoustic transceiver 180 may pass through the diamond table 162 and/or the substrate 164 to an interface between the diamond table 162 and the formation. The acoustic transceiver 180 may be used to study the difference between the characteristic impedance of the formation and the cutting element 160". A material's acoustic impedance is its density times its sound speed. The acoustic reflection intensity at an interface between a cutter and an earth formation depends upon the acoustic impedance of the cutter and the acoustic impedance of the earth formation. Thus, the earth formation's impedance can be calculated from the cutter's impedance and the measured reflection intensity at the interface of the cutter with that formation. The formation's impedance can be used to infer the formation's mineralogy if the pressure and temperature of the formation are known. The cutter's thickness can be determined from the cutter's sound speed and the acoustic travel time within the cutter, which would simultaneously allow cutter wear to be monitored in real-time or near real-time. The differences in characteristic impedances may provide information about the composition of the material in real-time or near real-time because each mineralogy has its own profile for acoustic impedance as a function of pressure and temperature and because pressure and temperature may also be measured at an earth-boring drill bit 100.

The earth-boring drill bit 100 (FIG. 1) may include various cutting elements, including cutting elements 154 without any instrumentation and cutting elements 160, 160', 160" comprising signal generators 166 and/or sensors 168. In some embodiments, the earth-boring drill bit 100 may include multiple instrumented cutting elements 160, 160', 160", which may be configured to measure different properties and/or locations along the path of the cutting elements 160, 160', 160". For example, some cutting elements 160, 160' may be configured to measure infrared signals, others may be configured to measure Raman shifts, and some cutting elements 160" may be configured to measure acoustic responses. The cutting elements 160, 160', 160" may provide real-time or near real-time information about the properties of the minerals of the formation.

Wellbores may be formed by using cutting elements 160, 160', 160" shown in FIGS. 2 through 4. For example, the earth-boring drill bit 100 (FIG. 1) may be attached to a drill string, which may be rotated while drilling. While drilling, a signal may be transmitted through the cutting element 160, 160', 160" to an interface between the cutting element 160, 160', 160" and the formation material. A response received at the sensor is measured as the cutting element is used to cut formation material. The response may be in the form of an infrared signal, a Raman shift, an acoustic signal, or any other appropriate signal.

For example, infrared spectroscopy may be used to help identify minerals in a wellbore. Spectroscopy is described in, for example, R. N. Clark, "Spectroscopy of Rocks and Minerals, and Principles of Spectroscopy," in MANUAL OF REMOTE SENSING, VOLUME 3, REMOTE SENSING FOR THE EARTH SCIENCES, 3-58 (A. N. Rencz, ed., 1999), the entire contents of which are hereby incorporated by reference. Infrared spectra of mixtures of water and oil at various temperatures are described in J. Pironon; et al. "Water in Petroleum Inclusions: Evidence from Raman and FT-IR Measurements, PVT Consequences," 69-70 *Journal of Geochemical Exploration* 663-668 (June 2000), the entire contents of which are hereby incorporated by reference. The spectra of water and oil vary with temperature, pressure, and composition. Similar spectra can be generated for other materials encountered in forming wellbores, such as for hydrocarbons. Peaks appear at different wavenumbers depending on the material. Therefore, a material may be differentiated from other materials by its infrared spectrum. When drilling multiple wells in a field, the types of minerals in the field may be identified in earlier-drilled wells, such that in subsequent drilling operations, an operator or a computer may identify the same minerals. Thus, drilling conditions may be varied in response to the in-situ identification of minerals.

Different wavelengths (reciprocal wavenumbers) may be selected for testing drilling fluids than for testing the solid formation itself. For example, to test the solid formation, a spectrometer may be configured to use mid-infrared radiation (e.g., wavelengths from about 2.5 μm to about 25.0 μm). Techniques for using infrared spectroscopy to measure the properties of minerals are described in, for example, A. S. Povarennykh, "The Use of Infrared Spectra for the Determination of Minerals," 63 AMERICAN MINERALOGIST, 956-959 (1978); and Graham R. Hunt & John W. Salisbury, "Visible and Near-Infrared Spectra of Minerals and Rocks: I Silicate Minerals," 1 MODERN GEOLOGY 283-300 (1970), each of which are incorporated in their entirety by this reference.

Raman spectroscopy may also be used to identify minerals. Spectra can be generated for materials encountered in forming wellbores. Peaks appear having different Raman shifts, depending on the material. Therefore, a material may be differentiated from other materials by its Raman spectrum. When drilling multiple wells in a field, the types of minerals in the formation of the field may be identified in earlier-drilled wells, such that in subsequent drilling operations, an operator or a computer may identify the same minerals. Thus, drilling conditions may be varied in response to the in-situ identification of minerals. Techniques for using Raman spectroscopy to measure the properties of minerals are described in, for example, Alian Wang et al., "Raman Spectroscopy as a Method for Mineral Identification on Lunar Robotic Exploration Missions," 100 J. GEOPHYSICAL RESEARCH 21189-99 (1995); Julie D. Stopar et al., "Raman Efficiencies of Natural Rocks and Minerals: Performance of a Remote Raman System for Planetary Exploration at a Distance of 10 Meters," 61 *Spectrochimica Acta Part A: Molecular and Biomolecular Spectroscopy* 2315-2323 (2005); the entire contents of each of which are incorporated in their entirety by this reference.

Figure 5:
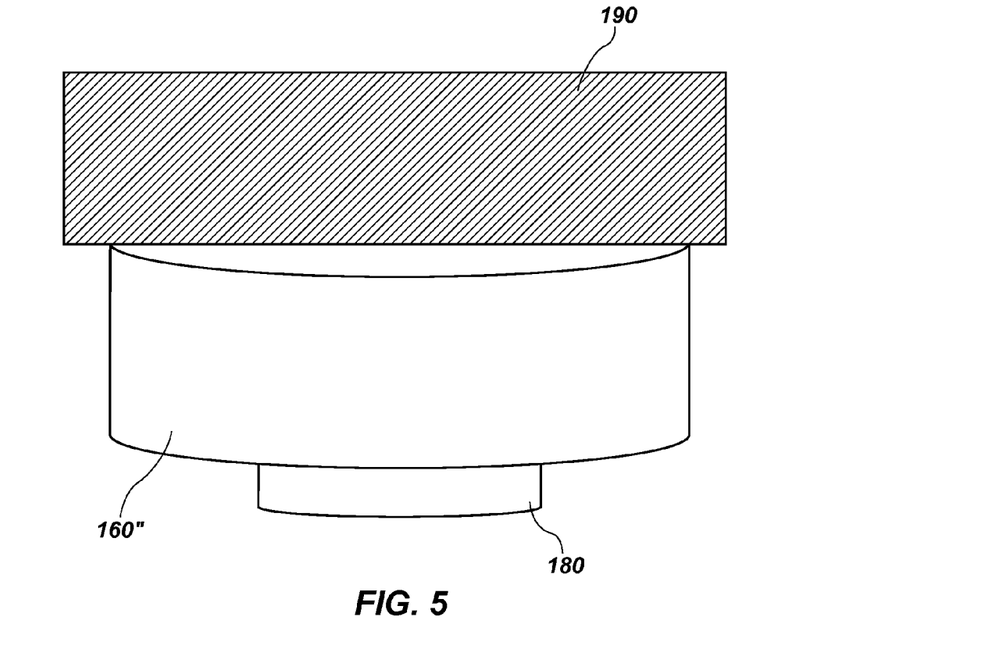
FIG. 5 is a simplified schematic of the cutting element of FIG. 4 in contact with a formation.

Acoustic impedance may also be used to identify minerals. FIG. 5 is a simplified schematic of the cutting element 160" of FIG. 4 in contact with a formation 190. Acoustic (sound) waves are generated in the acoustic transceiver 180. The acoustic waves are transmitted through the cutting element 160" to an interface between the cutting element 160" and the formation 190, then back through the cutting element 160" to the acoustic transceiver 180. The fraction of reflected acoustic energy depends on the ratio of the characteristic (acoustic) impedance of the cutting element 160" to the characteristic impedance of the formation 190. Characteristic impedance is an intensive material property, and is defined as the density of the material times the speed of sound through the material. The characteristic impedance of the cutting element 160" can be characterized in a laboratory to determine its changes with temperature and pressure. Thus, the characteristic impedance of the formation material can be calculated based on the ratio of the transmitted waves to the ratio of the reflected waves. Because different minerals have different characteristic impedances, likely mineralogy can be inferred. Techniques for using characteristic impedance to measure the properties of minerals are described in, for example, Matthew Salisbury and David Snyder, "Application of Seismic Methods to Mineral Exploration," in W. D. Goodfellow, ed., MINERAL DEPOSITS OF CANADA: A SYNTHESIS OF MAJOR DEPOSIT-TYPES, DISTRICT METALLOGENY, THE EVOLUTION OF GEOLOGICAL PROVINCES, AND EXPLORATION METHODS, 971-982 (Geological Assoc. of Canada, 2007); and Per Avseth et al., QUANTITATIVE SEISMIC INTERPRETATION: APPLYING ROCK PHYSICS TOOLS TO REDUCE INTERPRETATION RISK 168-211 (2005), each of which are incorporated in their entireties by this reference.

Figure 6:
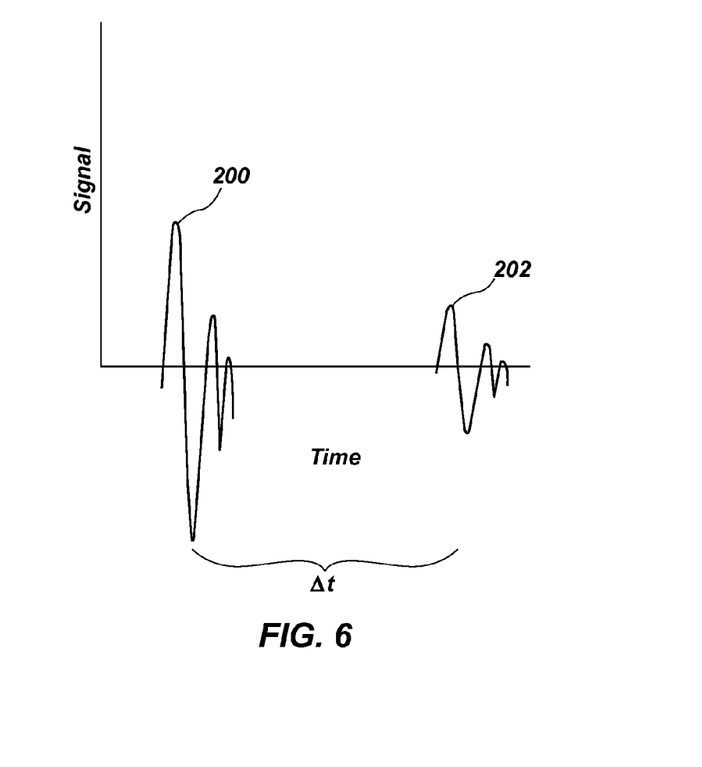
FIG. 6 is a simplified chart illustrating acoustic signals transmitted through the cutting element of FIG. 4.

FIG. 6 is a simplified chart illustrating a signal 200 transmitted from an acoustic transceiver 180 (FIG. 5) and a signal 202 reflected from an interface between the cutting element 160" and the formation 190. In use, the cutting element 160" may be kept in intimate contact with the formation 190 to provide a continuous medium through which the signals 200, 202 can travel. The signal 202 has a lower amplitude than the signal 200, and is determined by the ratio of the acoustic impedance of the cutting element 160" to the acoustic impedance of the formation 190. Furthermore, there is a time delay Δt between transmission of the signal 200 and reception of the signal 200 at the acoustic transceiver 180. The time delay Δt, which may be referred to in the art as "time of flight," correlates with the distance the signals 200, 202 travel. Because the signals 200, 202 travel through the cutting element 160" and back, the thickness of the cutting element 160" may be determined by the time of flight. Cutting elements 160" tend to wear during use, so the thickness of the cutting element 160" may be used as an indicator of the condition of the cutting element 160".

Additional non-limiting example embodiments of the disclosure are described below.

Embodiment 1

An earth-boring tool comprising at least one cutting element comprising a hard material and at least one of a signal generator configured to provide an electromagnetic or acoustic signal to an interface between a surface of the hard material and a subterranean formation in contact with at least a portion of the surface, and wherein a sensor is configured to receive a return electromagnetic or acoustic signal from the interface.

Embodiment 2

The earth-boring tool of Embodiment 1, wherein the earth-boring tool comprises a sensor configured as a spectrometer.

Embodiment 3

The earth-boring tool of Embodiment 2, wherein the spectrometer comprises an infrared spectrometer.

Embodiment 4

The earth-boring tool of Embodiment 3, wherein the spectrometer comprises a middle-infrared spectrometer.

Embodiment 5

The earth-boring tool of Embodiment 3 or Embodiment 4, wherein the spectrometer comprises a spectrometer configured to detect at least one wavelength from about 2.5 μm to about 12.0 μm.

Embodiment 6

The earth-boring tool of Embodiment 2, wherein the spectrometer comprises a Raman spectrometer.

Embodiment 7

The earth-boring tool of Embodiment 1, wherein the at least one of a signal generator and a sensor comprises an acoustic transducer.

Embodiment 8

The earth-boring tool of any of Embodiments 1 through 7, wherein the at least one cutting element comprises a body having at least one exterior surface transparent to at least one wavelength of electromagnetic radiation, the body defining at least one cavity therein.

Embodiment 9

The earth-boring tool of any of Embodiments 1 through 8, wherein the at least one cutting element comprises diamond.

Embodiment 10

The earth-boring tool of Embodiment 9, wherein the at least one cutting element comprises a single-crystal diamond window.

Embodiment 11

The earth-boring tool of Embodiment 9, wherein the at least one cutting element comprises polycrystalline diamond.

Embodiment 12

The earth-boring tool of Embodiment 9, wherein the at least one cutting element comprises at least one diamond fiber configured to transmit the electromagnetic or acoustic signal between the at least one of a signal generator and a sensor and the interface.

Embodiment 13

The earth-boring tool of Embodiment 9 or Embodiment 12, wherein the at least one cutting element comprises at least one diamond fiber configured to transmit the electromagnetic or acoustic signal between the interface and the at least one of a signal generator and a sensor.

Embodiment 14

The earth-boring tool of any of Embodiments 1 through 13, wherein the earth-boring tool comprises a transceiver comprising both a signal generator and a sensor.

Embodiment 15

The earth-boring tool of any of Embodiments 1 through 14, further comprising a module configured to transmit data between the sensor and a data collection system.

Embodiment 16

The earth-boring tool of any of Embodiments 1 through 15, further comprising at least one non-instrumented cutting element.

Embodiment 17

A method of forming a wellbore comprising rotating an earth-boring tool within a wellbore and cutting formation material with at least one cutting element mounted thereto, transmitting a signal through at least one cutting element to an interface between a surface of the at least one cutting element and the formation material, and measuring a response received at a sensor from the interface as the at least one cutting element is used to cut formation material. The at least one cutting element comprises a generally planar volume of hard material. The earth-boring tool further comprises a transmitter coupled to the at least one cutting element, the transmitter comprising at least one of an electromagnetic and an acoustic transmitter, and a sensor coupled to the at least one cutting element. The sensor is at least one of a spectrometer and an acoustic receiver, the signal is at least one of an electromagnetic signal and an acoustic signal, and the response is at least one of an electromagnetic and an acoustic response.

Embodiment 18

The method of Embodiment 17, wherein measuring a response received at the sensor as the at least one cutting element is used to cut formation material comprises determining a composition of the formation material.

Embodiment 19

The method of Embodiment 17 or Embodiment 18, wherein measuring a response received at the sensor as the at least one cutting element is used to cut formation material comprises determining a thickness of the at least one cutting element.

Embodiment 20

The method of any of Embodiments 17 through 19, wherein measuring a response received at the sensor as the at least one cutting element is used to cut formation material comprises measuring an amplitude of the response.

Embodiment 21

The method of any of Embodiments 17 through 20, wherein measuring a response received at the sensor as the at least one cutting element is used to cut formation material comprises measuring a period of time between the transmission of the signal and reception of the response at the sensor.

Embodiment 22

The method of any of Embodiments 17 through 22, wherein measuring a response received at the sensor as the at least one cutting element is used to cut formation material comprises measuring an infrared or Raman signal at the sensor.

Embodiment 23

The method of any of Embodiments 17 through 22, wherein measuring a response received at the sensor as the at least one cutting element is used to cut formation material comprises measuring a wavelength between about 2.5 µm and about 12.0 µm.

Embodiment 24

The method of any of Embodiments 17 through 22, wherein measuring a response received at the sensor as the at least one cutting element is used to cut formation material comprises measuring an acoustic impedance of the formation material.

Embodiment 25

The method of any of Embodiments 17 through 24, wherein rotating an earth-boring tool within a wellbore and cutting formation material using the cutting element comprises disposing the generally planar volume of hard material parallel to and in contact with a surface of the formation material.

Embodiment 26

The method of any of Embodiments 17 through 25, further comprising recording information received by the sensor.

Embodiment 27

The method of any of Embodiments 17 through 26, further comprising characterizing a mineralogy of the formation material using data obtained by the sensor.

Embodiment 28

A cutting element for an earth-boring drilling tool comprising a cutting element body having a cutting surface thereon, at least one transmitter oriented and configured to dispense an electromagnetic or acoustic signal to an interface between the cutting surface and a surface of a subterranean formation engaged by at least a portion of the cutting surface, and at least one sensor oriented and configured to measure a signal returned from the interface between the cutting surface and the surface of the subterranean formation engaged by the at least a portion of the cutting surface.

Embodiment 29

The cutting element of Embodiment 28, wherein the at least one sensor is configured to measure an electromagnetic or acoustic signal reflected from the interface.

Embodiment 30

The cutting element of Embodiment 28, wherein the at least one sensor is configured to measure an electromagnetic or acoustic signal retransmitted from the interface.

Embodiment 31

The cutting element of any of Embodiments 28 through 30, wherein the at least one sensor is disposed within a void defined by the cutting element body.

While the present disclosure has been set forth herein with respect to certain embodiments, those of ordinary skill in the art will recognize and appreciate that it is not so limited. Rather, many additions, deletions, and modifications to the embodiments described herein may be made without departing from the scope of the invention as hereinafter claimed. In addition, features from one embodiment may be combined with features of another embodiment while still being encompassed within the scope of the invention as contemplated by the inventors.

What is claimed is:

1. An earth-boring tool, comprising:
   a bit body defining at least one pocket therein;
   at least one cutting element secured within the at least one pocket of the bit body, the at least one cutting element comprising a hard material, a substrate, and a window laterally surrounded by the hard material, wherein the window comprises a material having a different composition or structure than the hard material and the same thickness as the hard material; and at least one signal generator and at least one sensor, wherein the at least one signal generator and the at least one sensor are each disposed within a void defined within the substrate of the at least one cutting element, wherein the at least one signal generator is configured to provide an electromagnetic or acoustic signal through the window to an interface between a surface of the hard material and a subterranean formation in contact with at least a portion of the surface, and wherein the at least one sensor is configured to receive a return electromagnetic or acoustic signal through the window from the interface.

2. The earth-boring tool of claim 1, wherein the at least one signal generator is configured to provide electromagnetic radiation to the interface, and wherein the at least one sensor comprises a spectrometer configured to receive electromagnetic radiation from the interface.

3. The earth-boring tool of claim 2, wherein the spectrometer comprises an infrared spectrometer.

4. The earth-boring tool of claim 1, wherein the window comprises at least one exterior surface transparent to at least one wavelength of electromagnetic radiation.

5. The earth-boring tool of claim 1, wherein the window comprises a single-crystal diamond window.

6. The earth-boring tool of claim 5, wherein the hard material comprises polycrystalline diamond.

7. The earth-boring tool of claim 1, wherein the earth-boring tool comprises a transceiver comprising both a signal generator and a sensor.

8. A method of forming a wellbore, comprising:
   rotating a bit body of an earth-boring tool within a wellbore and cutting formation material with at least one cutting element mounted within at least one pocket of the bit body, the at least one cutting element comprising:
   a generally planar volume of hard material bonded to a substrate;
   a window laterally surrounded by the hard material, wherein the window comprises a material having a different composition or structure than the hard material and the same thickness as the hard material;
   a transmitter disposed within a void defined within the substrate, the transmitter comprising at least one transmitter selected from the group consisting of an electromagnetic and an acoustic transmitter; and
   a sensor disposed within the void defined within the substrate, the sensor comprising at least one sensor selected from the group consisting of a spectrometer and an acoustic receiver;
   transmitting a signal through the window to an interface between a surface of the at least one cutting element and the formation material, the signal comprising at least one signal selected from the group consisting of an electromagnetic signal and an acoustic signal; and
   measuring a response received at the sensor from the interface through the window as the at least one cutting element is used to cut formation material, the response comprising at least one response selected from the group consisting of an electromagnetic response and an acoustic response.

9. The method of claim 8, wherein measuring a response received at the sensor as the at least one cutting element is used to cut formation material comprises determining a composition of the formation material.

10. The method of claim 8, wherein measuring a response received at the sensor as the at least one cutting element is used to cut formation material comprises determining a thickness of the at least one cutting element.

11. The method of claim 8, wherein measuring a response received at the sensor as the at least one cutting element is used to cut formation material comprises measuring an amplitude of the response.

12. The method of claim 8, wherein measuring a response received at the sensor as the at least one cutting element is used to cut formation material comprises measuring a period of time between the transmission of the signal and reception of the response at the sensor.

13. The method of claim 8, wherein measuring a response received at the sensor as the at least one cutting element is used to cut formation material comprises measuring an infrared or Raman signal at the sensor.

14. The method of claim 8, wherein measuring a response received at the sensor as the at least one cutting element is used to cut formation material comprises measuring a wavelength between about 2.5 µm and about 12.0 µm.

15. A cutting element for an earth-boring drilling tool, the cutting element comprising:
   cutting element body comprising a diamond table bonded to a substrate, and a window laterally surrounded by the diamond table wherein the window comprises a material having a different composition or structure than the diamond table and the same thickness as the diamond table, wherein the substrate defines a void within the substrate and wherein the diamond table defines a cutting surface;
   at least one transmitter disposed within the void within the substrate, the at least one transmitter oriented and configured to dispense an electromagnetic or acoustic signal through the window to an interface between the cutting surface and a surface of a subterranean formation engaged by at least a portion of the cutting surface; and
   at least one sensor disposed within the void within the substrate, the at least one sensor oriented and configured to measure an electromagnetic or acoustic signal returned through the window from the interface between the cutting surface and the surface of the subterranean formation engaged by the at least a portion of the cutting surface.

16. The cutting element of claim 15, wherein the at least one sensor is configured to measure an electromagnetic or acoustic signal reflected from the interface.

17. The cutting element of claim 15, wherein the at least one sensor is configured to measure an electromagnetic or acoustic signal retransmitted from the interface.

18. The cutting element of claim 15, wherein the window comprises single-crystal diamond.

* * * * *

UNITED STATES PATENT AND TRADEMARK OFFICE
CERTIFICATE OF CORRECTION

PATENT NO. : 9,995,088 B2  
APPLICATION NO. : 14/219886  
DATED : June 12, 2018  
INVENTOR(S) : Rocco DiFoggio Page 1 of 1

It is certified that error appears in the above-identified patent and that said Letters Patent is hereby corrected as shown below:

In the Specification

Column 6, Line 41, change "because The transceiver" to --because F=ma. The transceiver--

Signed and Sealed this  
Seventeenth Day of July, 2018

Andrei Iancu  
*Director of the United States Patent and Trademark Office*